US011888227B2

(12) United States Patent
Okajima

(10) Patent No.: US 11,888,227 B2
(45) Date of Patent: Jan. 30, 2024

(54) COMMUNICATION DEVICE

(71) Applicant: Murata Manufacturing Co., Ltd., Nagaokakyo (JP)

(72) Inventor: Yusuke Okajima, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 315 days.

(21) Appl. No.: 17/464,684

(22) Filed: Sep. 2, 2021

(65) Prior Publication Data

US 2021/0399432 A1 Dec. 23, 2021

Related U.S. Application Data

(63) Continuation of application No. PCT/JP2020/008117, filed on Feb. 27, 2020.

(30) Foreign Application Priority Data

Mar. 4, 2019 (JP) ................................ 2019-038863

(51) Int. Cl.
*H01Q 1/38* (2006.01)
*H01Q 13/08* (2006.01)
(Continued)

(52) U.S. Cl.
CPC ........... *H01Q 19/02* (2013.01); *H01Q 9/0421* (2013.01); *H01Q 9/0457* (2013.01); *H01Q 9/0485* (2013.01)

(58) Field of Classification Search
CPC .......... H01Q 1/1207; H01Q 1/12; H01Q 1/22; H01Q 1/24; H01Q 1/241; H01Q 1/38;
(Continued)

(56) References Cited

U.S. PATENT DOCUMENTS 5,565,875 A * 10/1996 Buralli ................. H01Q 9/0464 343/846
6,069,586 A * 5/2000 Karlsson ............. H01Q 19/005 343/815
(Continued)

FOREIGN PATENT DOCUMENTS

CN 107078406 A 8/2017
JP 7-183720 A 7/1995
(Continued)

OTHER PUBLICATIONS

Office Action dated Jan. 6, 2022 in Chinese Patent Application No. 202080018406.6, 12 pages.
(Continued)

*Primary Examiner* — Tho G Phan
(74) *Attorney, Agent, or Firm* — XSENSUS LLP

(57) ABSTRACT

An antenna device is supported by a supporting member. The antenna device includes a dielectric substrate and a patch antenna. The patch antenna comprises a radiating element and a ground conductor that are provided to the dielectric substrate. The linear conductor fixes a relative position between the antenna device and the supporting member in a direction orthogonal to a normal direction of the dielectric substrate. At least a part of the linear conductor is electromagnetically coupled with the patch antenna to act as a linear antenna.

20 Claims, 11 Drawing Sheets

(51) Int. Cl.
*H01Q 19/02* (2006.01)
*H01Q 9/04* (2006.01)

(58) Field of Classification Search
CPC ........... H01Q 1/40; H01Q 1/42; H01Q 13/08; H01Q 19/02; H01Q 21/06; H01Q 21/065; H01Q 23/00; H01Q 9/04; H01Q 9/0407; H01Q 9/0421; H01Q 9/0457; H01Q 9/0485
See application file for complete search history.

(56) References Cited

U.S. PATENT DOCUMENTS

| | | | | |
|---|---|---|---|---|
| 7,427,957 | B2 * | 9/2008 | Zeinolabedin Rafi | H01Q 19/005 343/770 |
| 9,263,803 | B1 * | 2/2016 | Weller | H01Q 3/01 |
| 9,812,783 | B2 * | 11/2017 | Quinlan | H01Q 9/0407 |
| 11,258,171 | B2 * | 2/2022 | Izawa | H01Q 1/48 |
| 11,264,702 | B1 * | 3/2022 | Chieh | H01Q 21/065 |
| 11,424,542 | B2 * | 8/2022 | Hamabe | H01Q 5/335 |

FOREIGN PATENT DOCUMENTS

| | | | |
|---|---|---|---|
| JP | 2004-48369 | A | 2/2004 |
| JP | 2017-188850 | A | 10/2017 |
| JP | 2017-535201 | A | 11/2017 |
| JP | 2017-228995 | A | 12/2017 |
| WO | 2017/047396 | A1 | 3/2017 |

OTHER PUBLICATIONS

International Search Report and Written Opinion dated May 26, 2020, received for PCT Application PCT/JP2020/008117, Filed on Feb. 27, 2020, 8 pages including English Translation.

Written Opinion of the International Searching Authority dated May 26, 2020, received for PCT Application PCT/JP2020/008117, Filed on Feb. 27, 2020, 4 pages. (Previously filed; submitting English translation only.).

* cited by examiner

COMMUNICATION DEVICE

CROSS-REFERENCE TO RELATED APPLICATIONS

The present application is a continuation of and claims priority to PCT/JP2020/008117, filed Feb. 27, 2020, which claims priority to JP 2019-038863, filed Mar. 4, 2019, the entire contents of each are incorporated herein by its reference.

TECHNICAL FIELD

The present invention relates to a communication device.

BACKGROUND ART

Patent Document 1 described below describes an antenna unit in which a flat antenna is fixed in a case. This antenna unit includes a lower case, a circuit board, a flat antenna, and an upper case. Through holes are formed through the circuit board and the flat antenna and fixing pins are provided to the lower case. The circuit board and the flat antenna are positioned with respect to the lower case by inserting the fixing pins in the through holes of the circuit board and the through holes of the flat antenna. The upper case and the lower case sandwich and fix the circuit board and the flat antenna.

CITATION LIST

Patent Document

Patent Document 1: Japanese Unexamined Patent Application Publication No. 7-183720

SUMMARY

Technical Problem

In the antenna unit disclosed in Patent Document 1, radio waves are mainly radiated in the normal direction of the flat antenna (radiating element) and an antenna gain is small in the direction orthogonal to the normal direction. One object of the present disclosure is to provide a communication device that is capable of increasing a gain in a direction orthogonal to a normal direction of a flat radiating element.

Solution to Problem

According to an aspect of the present disclosure,
there is provided an antenna device that includes
a dielectric substrate;
a patch antenna that includes a radiating element and a ground conductor which are provided to the dielectric substrate;
a supporting member that supports the antenna device; and
a linear conductor that fixes a relative position between the antenna device and the supporting member in a direction orthogonal to a normal direction of the dielectric substrate and of which at least a part is electromagnetically coupled with the patch antenna to act as a linear antenna.

Advantageous Effects

The linear antenna is excited in a manner coupled with the radiating element and thus, radio waves are radiated in the direction orthogonal to the normal direction of the radiating element. Accordingly, a gain in the direction orthogonal to the normal direction of the radiating element can be increased.

DESCRIPTION OF EMBODIMENTS

First Embodiment

A communication device according to the first embodiment will be described with reference to the drawings from FIG. 1 to FIG. 3.

Figure 1:
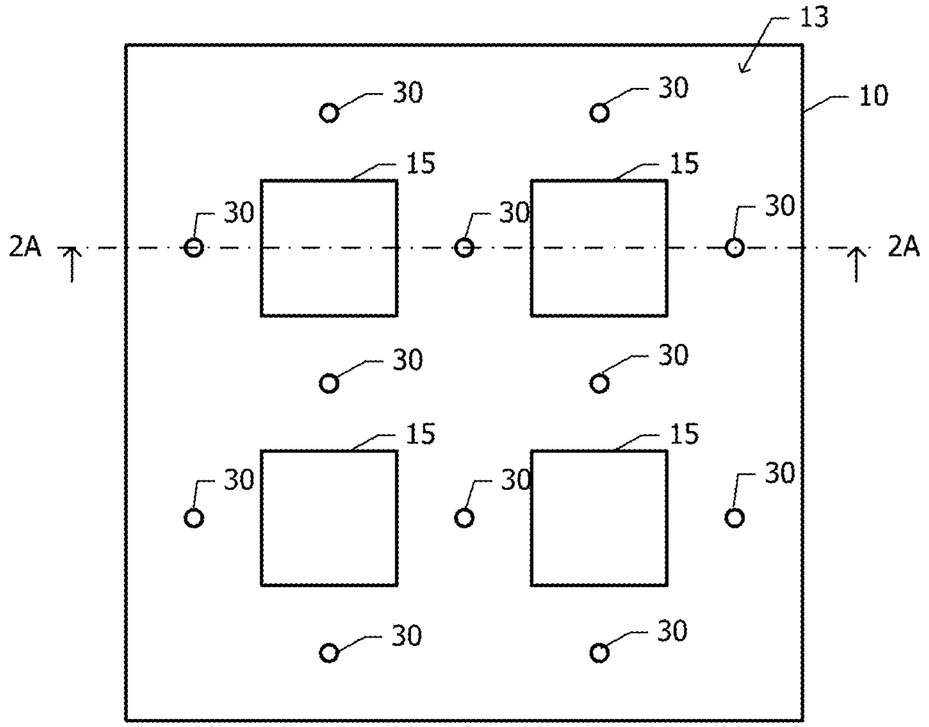
FIG. 1 is a diagram illustrating a planar positional relation between radiating elements and linear conductors of a communication device according to a first embodiment.

FIG. 1 is a diagram illustrating a planar positional relation between radiating elements 15 and linear conductors 30 of the communication device according to the first embodiment. Four flat radiating elements 15 are provided on a first surface 13 which is one surface of an antenna device 10. The four radiating elements 15 are arranged in a matrix of two rows and two columns.

Each radiating element 15 has a rectangular or square planar shape whose sides are parallel to each other in the row direction and column direction. Here, each radiating element 15 does not necessarily have to have the planar shape that is geometrically precisely rectangular or square. For example, each radiating element 15 may have a nearly-rectangular planar shape having four sides that partially overlap with respective four sides of a rectangle. Examples of the planar shape may include a planar shape that is obtained by cutting corners of a rectangle out with a triangle, square, or the like.

A plurality of linear conductors 30 having a cylindrical shape are arranged to correspond to each of the radiating elements 15. A conductor pin may be used as the linear conductor 30. The linear conductor 30 is disposed on a position that is separated from the radiating element 15 from a midpoint of one side of the radiating element 15 in a direction orthogonal to the side. Between two radiating elements 15 that are mutually adjacent in the row direction or the column direction, one linear conductor 30 is disposed at an equal distance from mutually-opposed sides of the two radiating elements 15. Here, the linear conductor 30 does not limitedly have the cylindrical shape but may have another elongated shape such as a quadrangular prism shape.

Figure 2A:
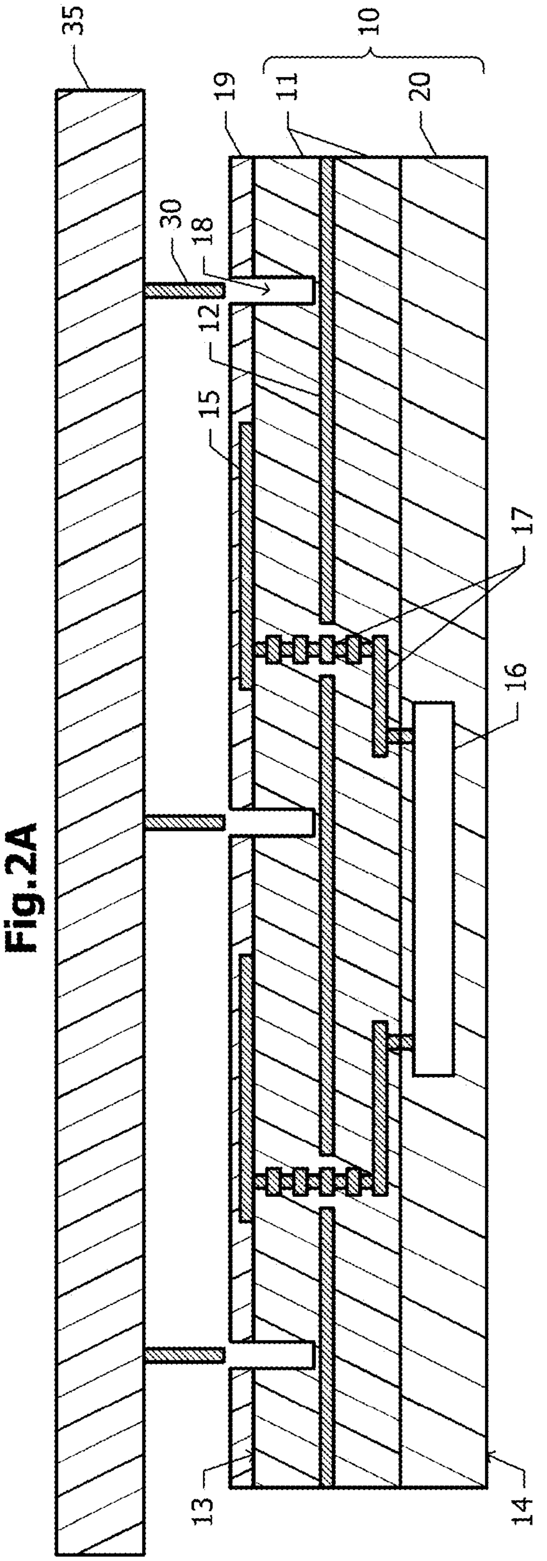
FIG. 2A is a sectional view of the communication device according to the first embodiment in a state that an antenna device is not attached to a supporting member.
Figure 2B:
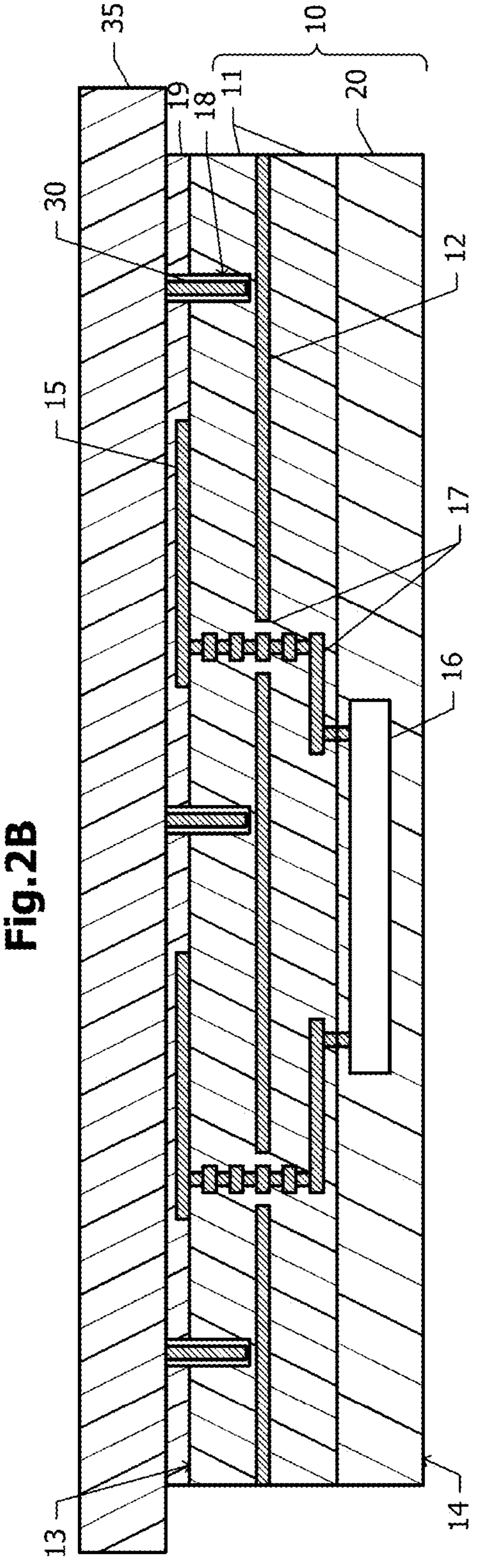
FIG. 2B is a sectional view of the communication device according to the first embodiment in a state that the antenna device is attached to the supporting member.

FIG. 2A and FIG. 2B are sectional views of the communication device cut along the dashed-dotted line 2A-2A of FIG. 1. The communication device according to the first embodiment includes the antenna device 10 and a supporting member 35. FIG. 2A illustrates a state that the antenna device 10 is not attached to the supporting member 35, and FIG. 2B illustrates a state that the antenna device 10 is attached to the supporting member 35.

The antenna device 10 includes a dielectric substrate 11, and one surface of the dielectric substrate 11 corresponds to the first surface 13 of the antenna device 10. A ground conductor 12 is disposed on an inner layer of the dielectric substrate 11 and a plurality of radiating elements 15 are arranged on the first surface 13. The radiating elements 15 and the ground conductor 12 constitute a patch antenna. A solder resist film 19 covers the radiating elements 15 and the first surface 13 of the dielectric substrate 11.

A high-frequency integrated circuit element 16 is mounted on an opposite surface to the surface, on which the radiating elements 15 are disposed, of the dielectric substrate 11. Each of the radiating elements 15 is connected to the high-frequency integrated circuit element 16 via a feeder 17 that is provided in the dielectric substrate 11 and is composed of a conductor pattern and a via conductor. The high-frequency integrated circuit element 16 is sealed with a sealing resin layer 20. A surface of the sealing resin layer 20 constitutes a second surface 14, which is an opposite surface to the first surface 13, of the antenna device 10. The antenna device 10 on which the high-frequency integrated circuit element 16 is mounted may be referred to as an antenna module.

A plurality of concave portions 18 are formed on the first surface 13 of the dielectric substrate 11. The plurality of concave portions 18 are arranged on positions corresponding to the linear conductors 30 in a plan view (FIG. 1). Further, the concave portions 18 do not reach the ground conductor 12 in the depth direction (the thickness direction).

The supporting member 35 is disposed to face the first surface 13 of the antenna device 10. A plurality of linear conductors 30 having a columnar shape are fixed on the surface, facing the antenna device 10, of the supporting member 35. The linear conductor 30 is made of a conductive material such as metal. The longitudinal directions of the plurality of linear conductors 30 are parallel to each other and are orthogonal to the surface of the supporting member 35 (parallel to the normal direction of the radiating element 15). The supporting member 35 corresponds to a casing of communication equipment in which the antenna device 10 is accommodated or a fixing portion of an antenna device in a casing, for example, and is made of an insulating material such as resin.

To support the antenna device 10 with respect to the supporting member 35, the plurality of linear conductors 30 are respectively inserted into the plurality of concave portions 18 of the antenna device 10. In the state that the linear conductors 30 are inserted in the concave portions 18, a relative position between the antenna device 10 and the supporting member 35 is fixed in the direction parallel to the first surface 13 (the direction orthogonal to the normal direction of the dielectric substrate 11). The linear conductors 30 are electromagnetically coupled with the radiating elements 15 and act as a parasitic linear antenna. Both end portions of the linear conductor 30 are not connected to the ground conductor 12 or other conductive structures, thus being electrically open. Therefore, the linear conductors 30 act as a dipole antenna.

Figure 3:
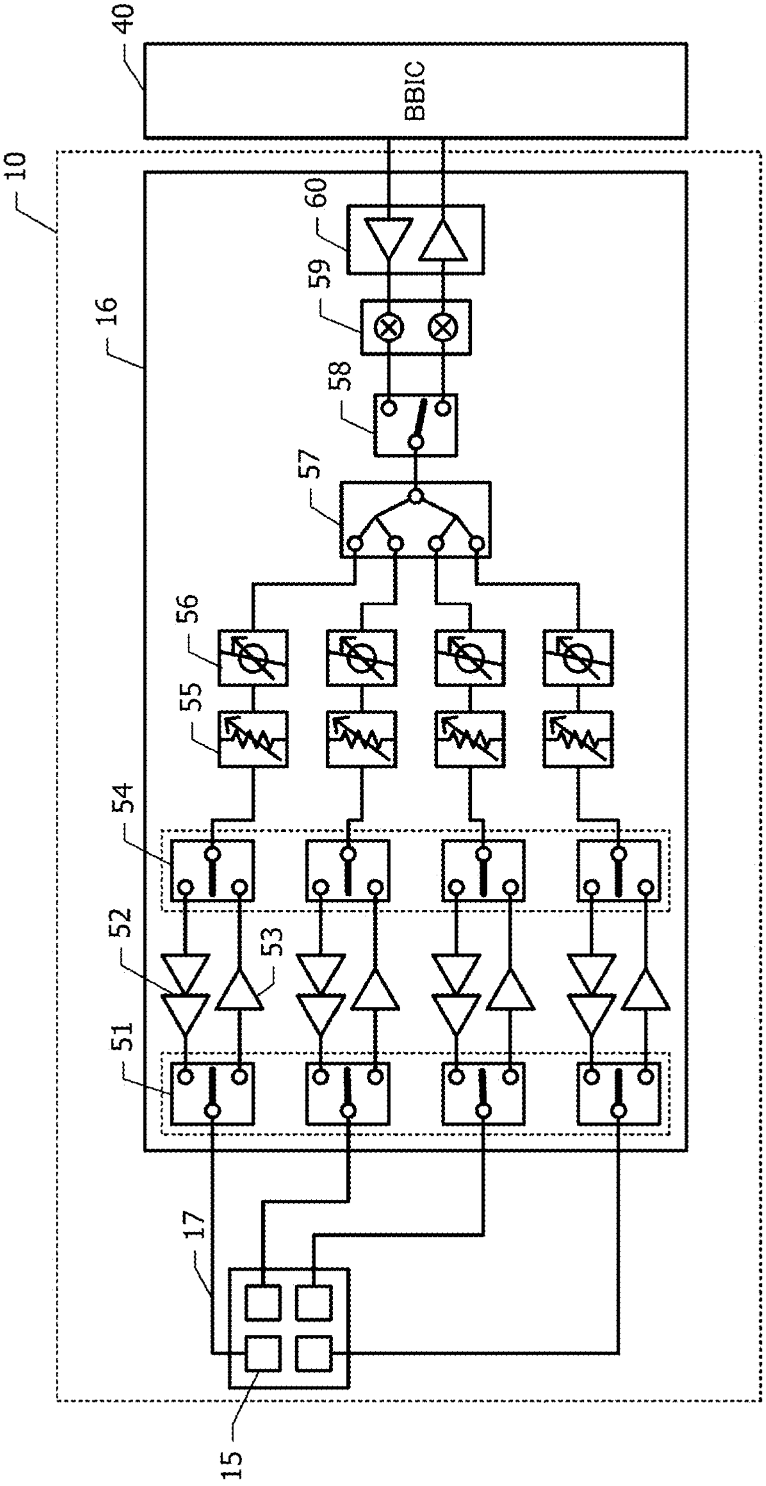
FIG. 3 is a block diagram of the communication device according to the first embodiment.

FIG. 3 is a block diagram of the communication device according to the first embodiment. The communication device according to the first embodiment is mounted on, for example, mobile terminals such as a mobile phone, a smartphone, and a tablet terminal, and personal computers and home appliances that have a communication function. The communication device according to the first embodiment includes the antenna device 10 and a baseband integrated circuit element (BBIC) 40 that performs baseband signal processing.

The antenna device 10 includes an antenna array composed of four radiating elements 15 and the high-frequency integrated circuit element 16. An intermediate frequency signal containing information to be transmitted is inputted into the high-frequency integrated circuit element 16 from the baseband integrated circuit element 40. The high-frequency integrated circuit element 16 up-converts the intermediate frequency signal, inputted from the baseband integrated circuit element 40, into a high frequency signal and supplies the high frequency signal to the plurality of radiating elements 15.

Also, the high-frequency integrated circuit element 16 down-converts a high frequency signal received by the four radiating elements 15. An intermediate frequency signal obtained through the down-conversion is inputted into the baseband integrated circuit element 40 from the high-frequency integrated circuit element 16. The baseband integrated circuit element 40 processes the intermediate frequency signal obtained through the down-conversion.

A transmission operation of the high-frequency integrated circuit element 16 will now be described. An intermediate frequency signal is inputted from the baseband integrated circuit element 40 to an up-down converting mixer 59 via an intermediate frequency amplifier 60. A high frequency signal obtained through up-conversion performed by the up-down converting mixer 59 is inputted into a power divider 57 via a transmission-reception changeover switch 58. Each of high frequency signals obtained through division performed by the power divider 57 is supplied to the radiating element 15 via a phase shifter 56, an attenuator 55, a transmission-reception changeover switch 54, a power amplifier 52, a transmission-reception changeover switch 51, and the feeder 17. The phase shifter 56, the attenuator 55, the transmission-reception changeover switch 54, the power amplifier 52, and the transmission-reception changeover switch 51, which perform processing of a high frequency signal obtained through division performed by the power divider 57, and the feeder 17 are provided for each radiating element 15.

A reception operation of the high-frequency integrated circuit element 16 will now be described. A high frequency signal that is received by each of the plurality of radiating elements 15 is inputted into the power divider 57 via the feeder 17, the transmission-reception changeover switch 51, a low-noise amplifier 53, the transmission-reception changeover switch 54, the attenuator 55, and the phase shifter 56. A high frequency signal obtained through synthesis performed by the power divider 57 is inputted into the up-down converting mixer 59 via the transmission-reception changeover switch 58. An intermediate frequency signal obtained through down-conversion performed by the up-down converting mixer 59 is inputted into the baseband integrated circuit element 40 via the intermediate frequency amplifier 60.

Here, the configuration may be employed that a baseband signal is transmitted and received instead of an intermediate frequency signal between the high-frequency integrated circuit element 16 and the baseband integrated circuit element 40. In this case, the high-frequency integrated circuit element 16 performs direct up-down conversion.

The high-frequency integrated circuit element 16 is provided as one chip of integrated circuit component having the above-described function, for example. Alternatively, the phase shifter 56, the attenuator 55, the transmission-reception changeover switch 54, the power amplifier 52, the low-noise amplifier 53, and the transmission-reception changeover switch 51 that correspond to the radiating element 15 may be provided as one chip of integrated circuit component for each radiating element 15.

Advantageous effects of the first embodiment will now be described.

In the first embodiment, when the antenna device 10 is attached to the supporting member 35, the linear conductors 30 are inserted into the concave portions 18 of the antenna device 10. Accordingly, the antenna device 10 can be easily positioned with respect to the supporting member 35 in the direction orthogonal to the normal direction of the first surface 13 of the antenna device 10.

The patch antenna composed of the radiating elements 15 and the ground conductor 12 has a large gain in the normal direction of the first surface 13 and a small gain in the direction parallel to the first surface 13. When the radiating elements 15 are excited, the dipole antenna composed of the linear conductors 30 that are coupled to the radiating elements 15 are also excited. The dipole antenna has a large gain in the direction parallel to the first surface 13. Accordingly, the antenna device 10 is capable of efficiently radiating radio waves not only in the normal direction of the first surface 13 but also in the direction orthogonal to the normal direction.

In order to efficiently excite the dipole antenna composed of the linear conductors 30, the electric length of the linear conductors 30 is preferably set to ½ of the resonance wavelength of the radiating elements 15. Further, in order to secure sufficiently-strong coupling between the radiating elements 15 and the linear conductors 30, the distance from a midpoint of each side of the radiating element 15 to the linear conductor 30 is preferably set to ½ or shorter than an interval between radiating elements 15 adjacent to each other in the column direction and row direction.

A modification of the first embodiment will now be described.

Four radiating elements 15 are provided to the antenna device 10 in the first embodiment, but the number of radiating elements 15 is not limited to four. It is sufficient to provide at least one radiating element 15.

The linear conductors 30 are disposed so as to respectively correspond to four sides of one radiating element 15 in the first embodiment, but it is sufficient to dispose at least one linear conductor 30 with respect to one radiating element 15. In this configuration, a gain can be chiefly increased in the direction from the radiating element 15 toward the linear conductor 30. Further, the linear conductor 30 is disposed on a position corresponding to a midpoint of one side of the radiating element 15, in the first embodiment. However, the linear conductor 30 does not necessarily have to be disposed on a position corresponding to a midpoint but may be disposed on a position shifted from the midpoint.

When the depth from the first surface 13 (FIG. 2B) to the ground conductor 12 (FIG. 2B) is small and sufficient length of the linear conductor 30 cannot be secured, an end portion of the linear conductor 30 on the supporting member 35 side may be bent in the L shape to secure the sufficient length. The bending direction of the linear conductor 30 may be the direction parallel to a corresponding side of the radiating element 15 in a plan view. This bending can strengthen the coupling between the radiating element 15 and the linear conductor 30 compared to bending in other directions.

One feed point is provided for one radiating element 15, in the first embodiment. However, two feed points may be provided to obtain a positional relation in which excitation directions are orthogonal to each other. This enables radiation of radio waves having a polarization plane of a desired direction between two polarization planes that are orthogonal to each other.

In FIG. 2A and FIG. 2B, the cross-sectional dimension of the concave portion 18 orthogonal to an axis direction thereof is larger than the cross-sectional dimension of the linear conductor 30 orthogonal to the axis direction thereof so as to illustrate the linear conductor 30 and the concave portion 18 in a distinguished manner. The cross-sectional dimension of the concave portion 18 is favorably set to be the nearly same as the cross-sectional dimension of the linear conductor 30. Accordingly, when the linear conductors 30 are inserted in the concave portions 18, the antenna device 10 can be supported with respect to the supporting member 35 by the friction force between the linear conductors 30 and the lateral surfaces of the concave portions 18.

The configuration may be employed that the ground conductor 12 is partially removed on a position on which the linear conductor 30 is disposed in a plan view so that the linear conductor 30 reaches a deeper position than the ground conductor 12. For example, an opening is formed through the ground conductor 12 so that the linear conductor 30 passes through the opening.

In the first embodiment, each radiating element 15 is formed with a single conductor pattern. However, a plurality of conductor patterns may be stacked to configure a stack type patch antenna. Also, the configuration may be employed that a feed element and a parasitic element are disposed on the same plane. Further, the planar shape of the radiating element 15 is square or rectangular in the first embodiment, but the shape of the radiating element 15 is not limited to these. For example, the planar shape of the radiating element 15 may be a cross shape that is obtained by cutting off four corners of a square or a rectangle.

The ground conductor 12 does not necessarily have to be disposed on the nearly whole region of the dielectric substrate 11 in a plan view. The ground conductor 12 may be disposed to include at least the radiating elements 15 in a plan view.

The surface of the sealing resin layer 20 may be covered by a shielding member such as a shielding case. Further, the high-frequency integrated circuit element 16 does not necessarily have to be sealed with the sealing resin layer 20. The high-frequency integrated circuit element 16 which is not sealed with the sealing resin layer 20 may be covered by a shielding member such as a shielding case.

The high-frequency integrated circuit element 16 may be mounted on the same surface as the surface of the dielectric substrate 11 on which the radiating elements 15 are provided.

The high-frequency integrated circuit element 16 is mounted on the dielectric substrate 11 on which the radiating elements 15 are provided, in the first embodiment. However, the high-frequency integrated circuit element 16 may be mounted on another substrate and the antenna device 10 may be mounted on the substrate on which the high-frequency integrated circuit element 16 is mounted.

It is favorable that the radiating elements 15 resonate in a sub-millimeter wave band and millimeter wave band and the communication device according to the first embodiment transmits/receives high frequency signals of the sub-millimeter wave band and millimeter wave band. Here, the sub-millimeter wave band and the millimeter wave band mean frequency bands of a frequency from 20 GHz to 300 GHz inclusive.

Second Embodiment

A communication device according to a second embodiment will now be described with reference to FIG. 4A and FIG. 4B. Description will be omitted below for the configuration common to that of the communication device according to the first embodiment (FIG. 1, FIG. 2A, FIG. 2B, and FIG. 3).

Figure 4A:
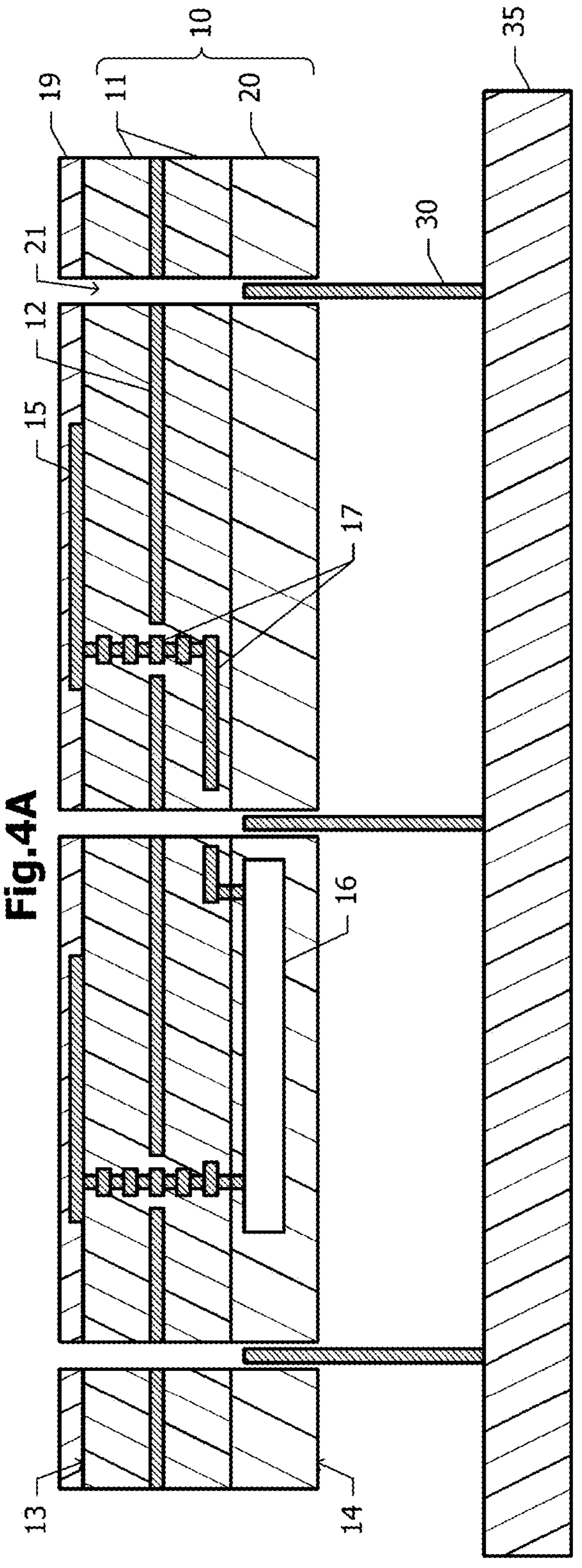
FIG. 4A is a sectional view of a communication device according to a second embodiment in a state that an antenna device is not attached to a supporting member.
Figure 4B:
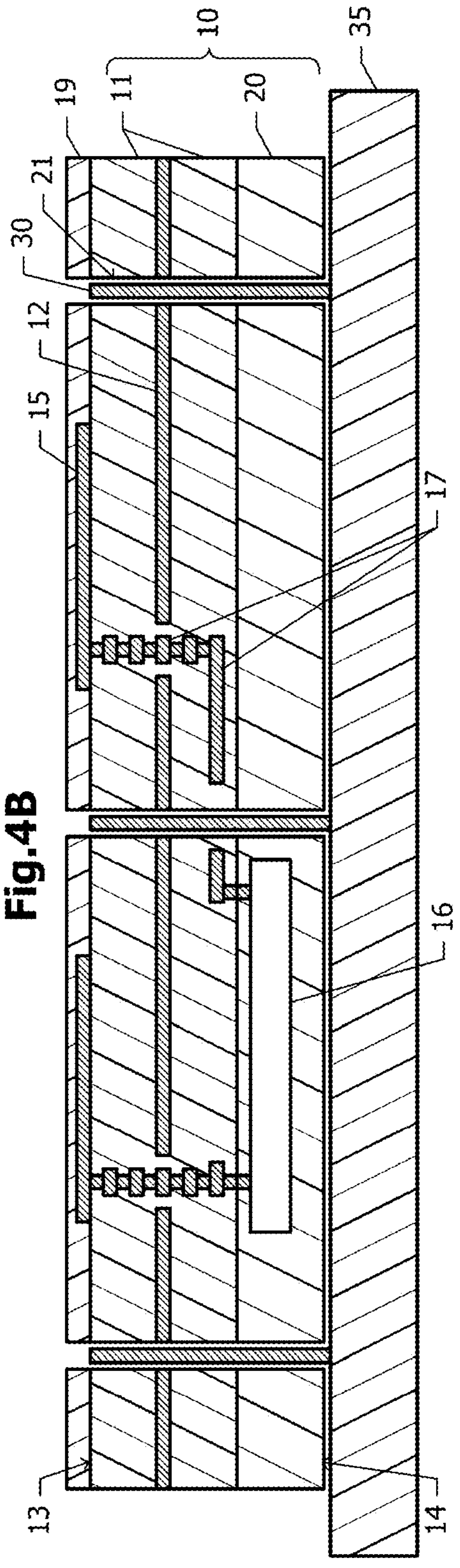
FIG. 4B is a sectional view of the communication device according to the second embodiment in a state that the antenna device is attached to the supporting member.

FIG. 4A is a sectional view of the communication device according to the second embodiment in a state that the antenna device 10 is not attached to the supporting member 35. FIG. 4B is a sectional view of the communication device according to the second embodiment in a state that the antenna device 10 is attached to the supporting member 35. In the first embodiment, the first surface 13 of the antenna device 10 on which the radiating elements 15 are disposed faces the supporting member 35. On the other hand, the second surface 14 of the antenna device 10 faces the supporting member 35, in the second embodiment.

A plurality of through holes 21 are formed through the antenna device 10 instead of the concave portions 18 (FIG. 2A and FIG. 2B) of the first embodiment. The through holes 21 reach the first surface 13 from the second surface 14. The through holes 21 penetrate through the ground conductor 12 and the ground conductor 12 is exposed on lateral surfaces of the through holes 21.

The plurality of linear conductors 30 fixed on the supporting member 35 are respectively inserted into the through holes 21 and the antenna device 10 is thus supported with respect to the supporting member 35. The linear conductor 30 reaches a position closer to the first surface 13 than a position on which the ground conductor 12 is disposed and the linear conductor 30 is short-circuited or capacitive-coupled with the ground conductor 12. Parts of the linear conductors 30 act as a parasitic monopole antenna. The parts are on the closer side to the first surface 13 from points at which the linear conductors 30 are short-circuited or capacitive-coupled with the ground conductor 12.

Advantageous effects of the second embodiment will now be described.

As is the case with the first embodiment, the antenna device 10 can be easily positioned with respect to the supporting member 35 also in the second embodiment. Further, parts of the linear conductors 30 act as a monopole antenna in the second embodiment. Accordingly, a gain in the direction orthogonal to the normal direction of the first surface 13 can be increased as is the case with the first embodiment.

In order to efficiently operate the parts of the linear conductors 30 as a monopole antenna, it is preferable to set the electric length of the part of the linear conductor 30, which is on the closer side to the first surface 13 from the point at which the linear conductor 30 is short-circuited or capacitive-coupled with the ground conductor 12, to ¼ of the resonance wavelength of the radiating element 15. Here, in consideration of capacitance of the capacitive-coupling between the ground conductor 12 and the linear conductor 30, the linear conductor 30 may resonate at the same wavelength as the resonance wavelength of the radiating element 15. The linear conductors 30 may fit in the inside of the antenna device 10 or may protrude from the first surface 13.

A modification of the second embodiment will now be described.

The linear conductors 30 act as a monopole antenna in the second embodiment, but the configuration may be employed that the linear conductors 30 act as a dipole antenna. In order to operate the linear conductors 30 as a dipole antenna, it is favorable to secure a sufficient distance between the linear conductor 30 and the ground conductor 12 so that the linear conductor 30 and the ground conductor 12 are not substantially coupled with each other. In this case, the electric length of the linear conductor 30 is preferably set to ½ of the resonance wavelength of the radiating element 15.

Third Embodiment

A communication device according to a third embodiment will now be described with reference to FIG. 5A and FIG. 5B. Description will be omitted below for the configuration common to that of the communication device according to the first embodiment (FIG. 1, FIG. 2A, FIG. 2B, and FIG. 3).

Figure 5A:
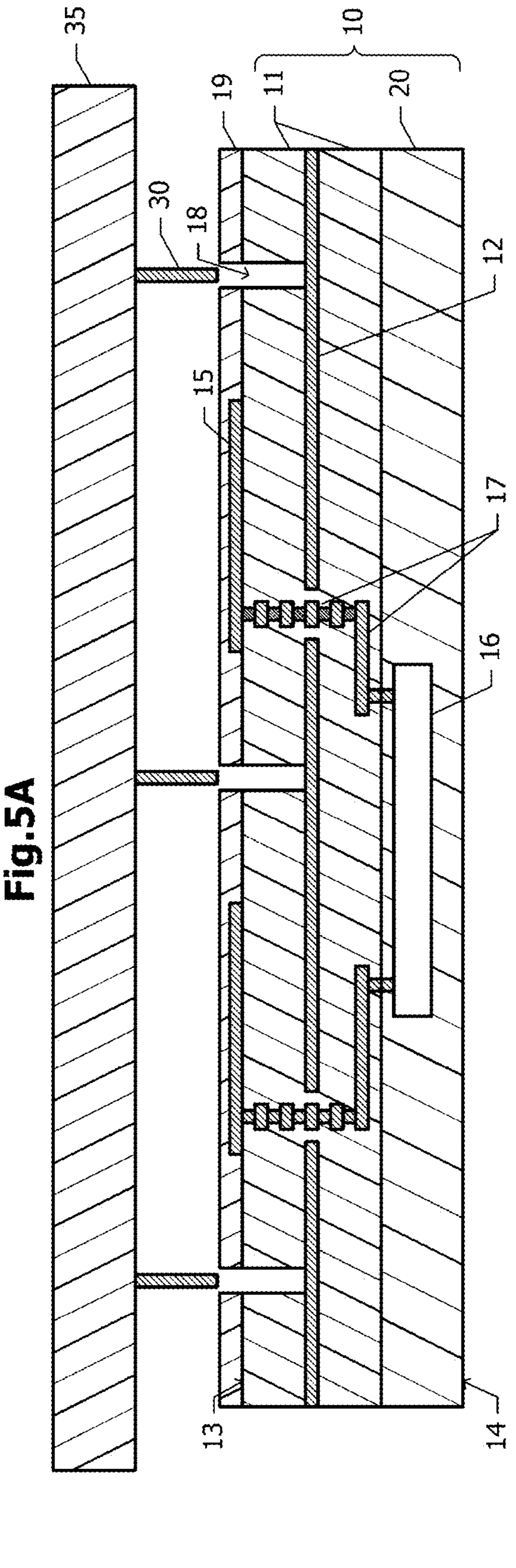
FIG. 5A is a sectional view of a communication device according to a third embodiment in a state that an antenna device is not attached to a supporting member.
Figure 5B:
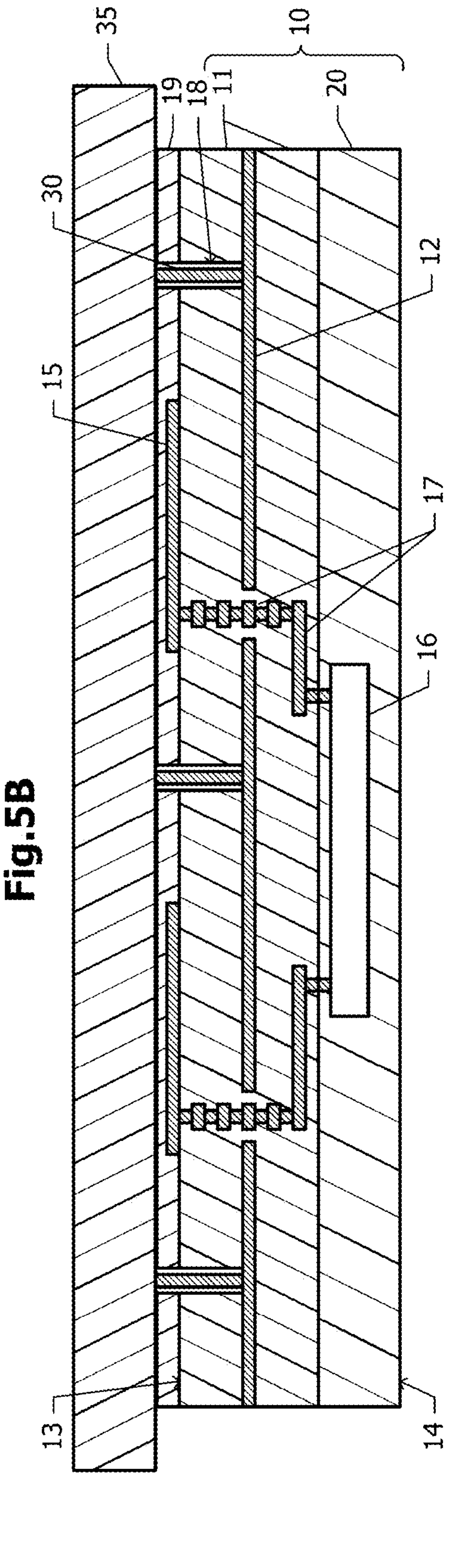
FIG. 5B is a sectional view of the communication device according to the third embodiment in a state that the antenna device is attached to the supporting member.

FIG. 5A is a sectional view of the communication device according to the third embodiment in a state that the antenna device 10 is not attached to the supporting member 35. FIG. 5B is a sectional view of the communication device according to the third embodiment in a state that the antenna device 10 is attached to the supporting member 35. In the first embodiment, the concave portions 18 (FIG. 2A and FIG. 2B) formed on the antenna device 10 do not reach the ground conductor 12. On the other hand, the concave portions 18 formed on the antenna device 10 reach the ground conductor 12 and the ground conductor 12 is exposed on the bottoms of the concave portions 18, in the third embodiment.

When the tip of the linear conductor 30 inserted in the concave portion 18 comes into contact with the ground conductor 12, the tip of the linear conductor 30 is short-circuited to the ground conductor 12.

Advantageous effects of the third embodiment will now be described.

As is the case with the first embodiment, the antenna device 10 can be easily positioned with respect to the supporting member 35 also in the third embodiment. Further, the tips of the linear conductors 30 are short-circuited to the ground conductor 12 in the third embodiment, so the linear conductors 30 act as a parasitic monopole antenna. Accordingly, the gain in the direction orthogonal to the normal direction of the first surface 13 can be increased as is the case with the first embodiment. In order to efficiently operate the linear conductors 30 as a monopole antenna, the electric length of the linear conductor 30 is preferably set to ¼ of the resonance wavelength of the radiating element 15.

A modification of the third embodiment will now be described.

The tip of the linear conductor 30 is short-circuited to the ground conductor 12 in the third embodiment, but the tip of the linear conductor 30 may be capacitive-coupled with the ground conductor 12 instead of being short-circuited.

Fourth Embodiment

A communication device according to a fourth embodiment will now be described with reference to FIG. 6A and FIG. 6B. Description will be omitted below for the configuration common to that of the communication device according to the first embodiment (FIG. 1, FIG. 2A, FIG. 2B, and FIG. 3).

Figure 6A:
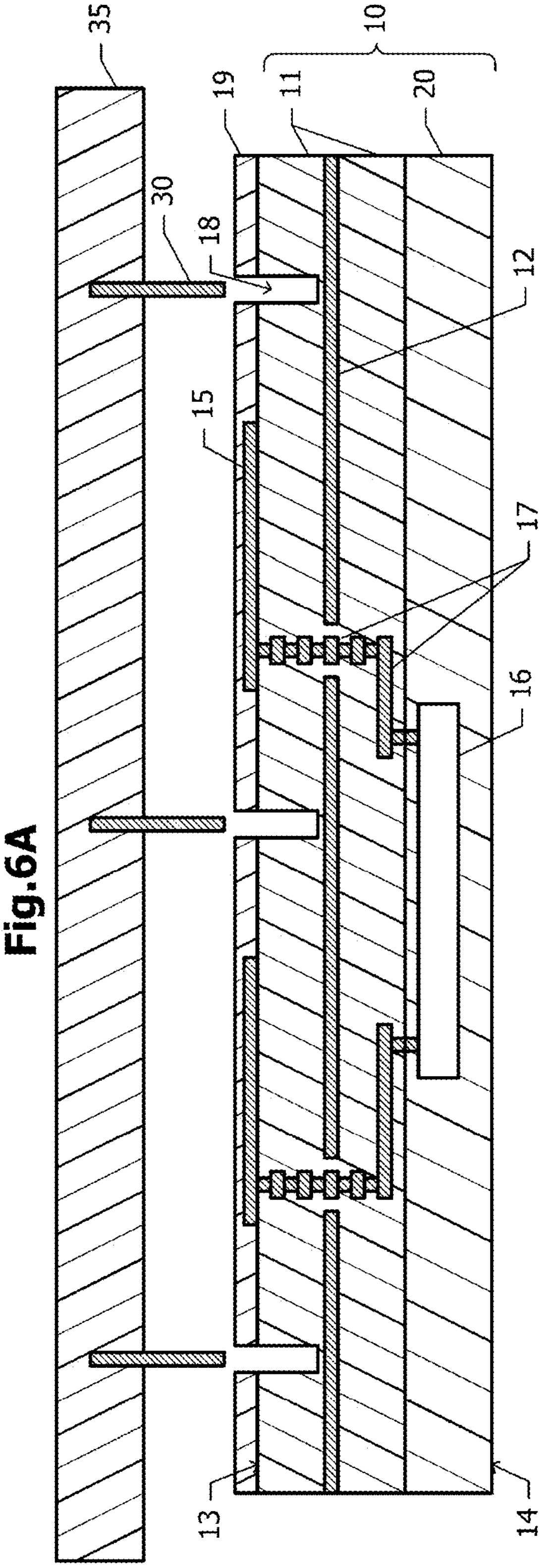
FIG. 6A is a sectional view of a communication device according to a fourth embodiment in a state that an antenna device is not attached to a supporting member.
Figure 6B:
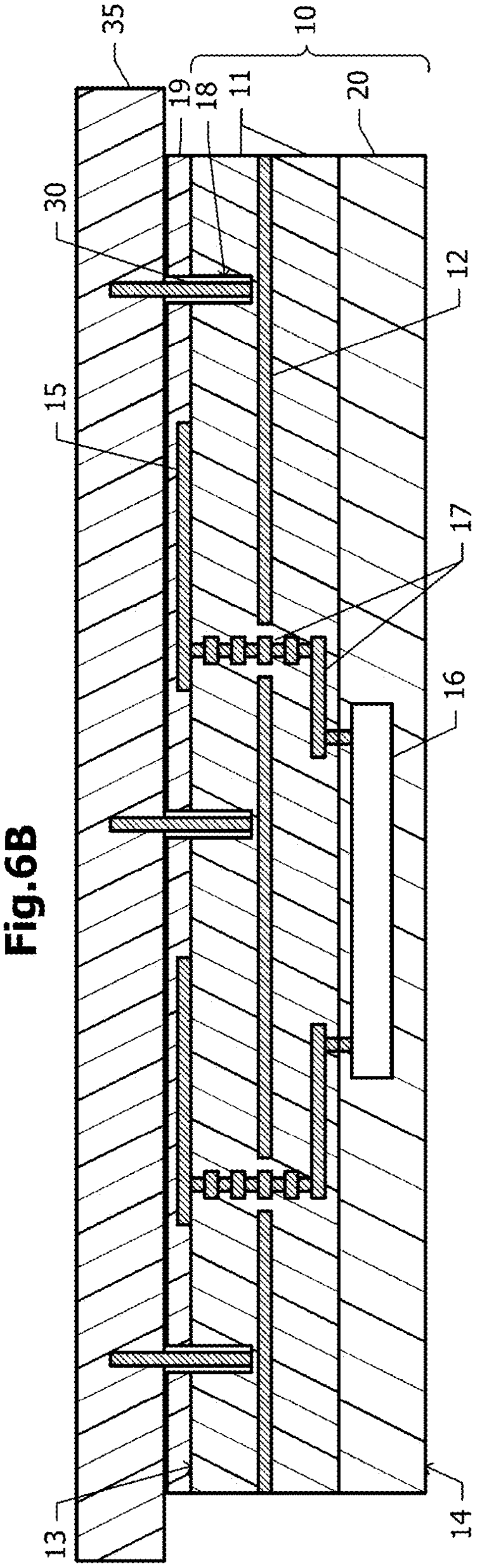
FIG. 6B is a sectional view of the communication device according to the fourth embodiment in a state that the antenna device is attached to the supporting member.

FIG. 6A is a sectional view of the communication device according to the fourth embodiment in a state that the antenna device 10 is not attached to the supporting member 35. FIG. 6B is a sectional view of the communication device according to the fourth embodiment in a state that the antenna device 10 is attached to the supporting member 35. In the first embodiment, end surfaces of the linear conductors 30 are in contact with the surface of the supporting member 35 (FIG. 2A and FIG. 2B). On the other hand, parts of the linear conductors 30 on their one end portion side are embedded in the supporting member 35, in the fourth embodiment. A part protruding from the supporting member 35 in the linear conductor 30 is inserted into the concave portion 18.

Advantageous effects of the fourth embodiment will now be described.

As is the case with the first embodiment, the antenna device 10 can be easily positioned with respect to the supporting member 35 also in the fourth embodiment. In the fourth embodiment, a part of the linear conductor 30 is embedded in the supporting member 35 and accordingly, the fixing force of the linear conductor 30 with respect to the supporting member 35 is increased. As a result, the antenna device 10 can be more firmly supported with respect to the supporting member 35.

As is the case with the first embodiment, the linear conductors 30 act as a parasitic dipole antenna also in the fourth embodiment. Accordingly, the gain in the direction orthogonal to the normal direction of the first surface 13 can be increased as is the case with the first embodiment. In order to efficiently operate the linear conductors 30 as a dipole antenna, the electric length of the linear conductor 30 is preferably set to ½ of the resonance wavelength of the radiating element 15.

In order to strengthen the coupling between the radiating element 15 and the linear conductor 30, it is preferable to match a central position of the linear conductor 30 in the longitudinal direction with the position of the radiating element 15 in the normal direction of the first surface 13.

In the first embodiment, the length of the linear conductor 30 is restricted to the depth from the first surface 13 to the ground conductor 12 (FIG. 2A and FIG. 2B). On the other hand, the linear conductor 30 can be formed to be longer than the depth from the first surface 13 to the ground conductor 12, in the fourth embodiment. Thus, freedom is advantageously increased in setting the length of the linear conductor 30.

A modification of the fourth embodiment will now be described.

In the fourth embodiment, both end portions of the linear conductors 30 are electrically open and the linear conductors 30 act as a dipole antenna. However, the tips of the linear conductors 30 may be brought into contact or capacitive-coupled with the ground conductor 12 so as to operate the linear conductors 30 as a monopole antenna, as is the case with the third embodiment (FIG. 5B). The configuration may be employed that the linear conductors 30 penetrate through the ground conductor 12.

Fifth Embodiment

A communication device according to the fifth embodiment will now be described with reference to FIG. 7A and FIG. 7B. Description will be omitted below for the configuration common to that of the communication device according to the first embodiment (FIG. 1, FIG. 2A, FIG. 2B, and FIG. 3).

Figure 7A:
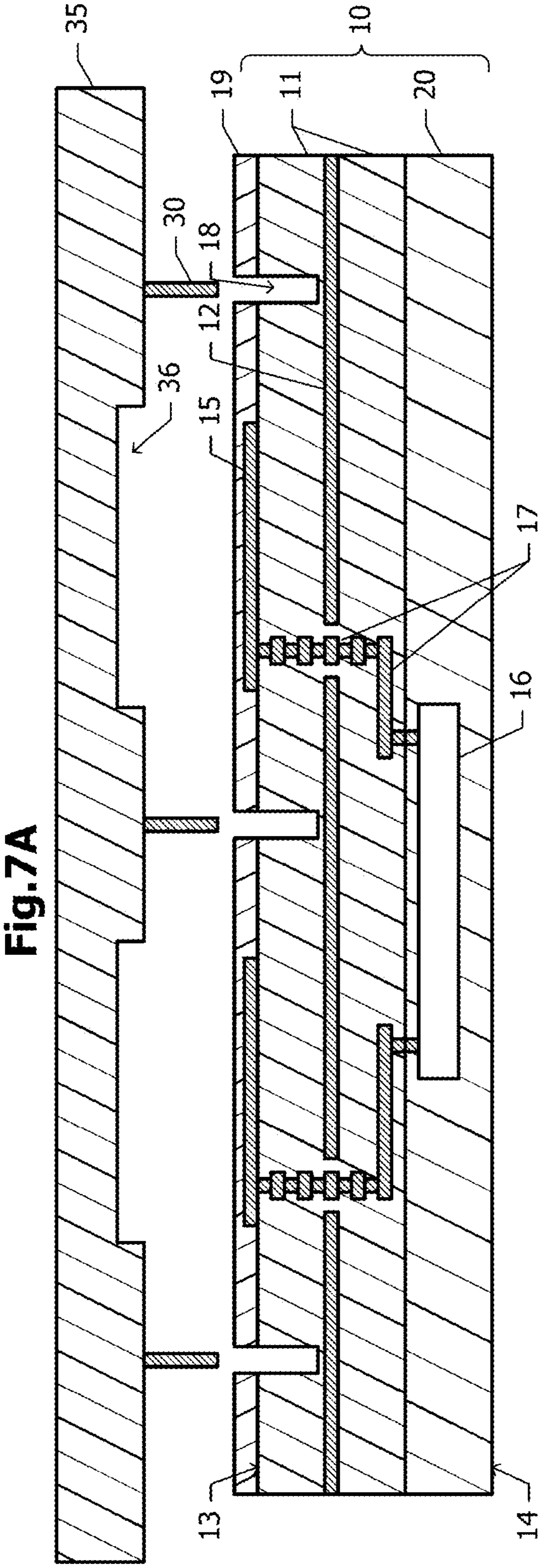
FIG. 7A is a sectional view of a communication device according to a fifth embodiment in a state that an antenna device is not attached to a supporting member.
Figure 7B:
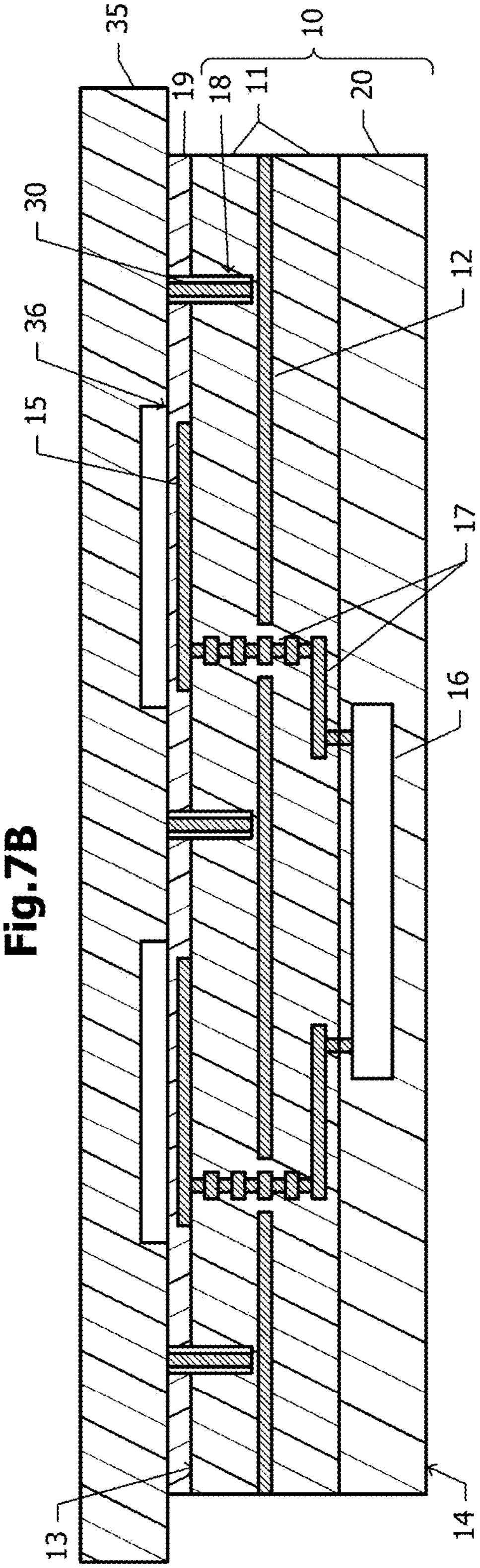
FIG. 7B is a sectional view of the communication device according to the fifth embodiment in a state that the antenna device is attached to the supporting member.

FIG. 7A is a sectional view of the communication device according to the fifth embodiment in a state that the antenna device 10 is not attached to the supporting member 35. FIG. 7B is a sectional view of the communication device according to the fifth embodiment in a state that the antenna device 10 is attached to the supporting member 35. In the first embodiment, the surface of the supporting member 35 (FIG. 2A and FIG. 2B) facing the antenna device 10 is flat, and the supporting member 35 is in contact with the solder resist film 19 in the state that the antenna device 10 is attached to the supporting member 35. On the other hand, a plurality of recesses 36 are formed on the surface, facing the antenna device 10, of the supporting member 35, in the fifth embodiment. The plurality of radiating elements 15 are disposed in the inside of the recesses 36 respectively in a plan view.

When the antenna device 10 is attached to the supporting member 35, the solder resist film 19 on the radiating elements 15 is not in contact with the bottom surfaces of the recesses 36 and hollows are thus formed between the solder resist film 19 and the supporting member 35.

Advantageous effects of the fifth embodiment will now be described.

As is the case with the first embodiment, the antenna device 10 can be easily positioned with respect to the supporting member 35 with the linear conductors 30 and the concave portions 18 also in the fifth embodiment. Further, the gain in the direction orthogonal to the normal direction of the first surface 13 can be increased.

Furthermore, hollows are secured between the solder resist film 19 on the radiating elements 15 and the supporting member 35 in the fifth embodiment, thereby reducing the influence of the supporting member 35 on the resonance wavelength of the radiating elements 15. To sufficiently obtain this advantageous effect, it is preferable to set an interval between the radiating element 15 and the bottom surface of the recess 36 to 1/10 or greater of the resonance wavelength of the radiating elements 15. For example, when the resonant frequency of the radiating element 15 is 60 GHz, it is preferable to set the interval between the radiating element 15 and the bottom surface of the recess 36 to 5 mm or greater.

Sixth Embodiment

A communication device according to a sixth embodiment will now be described with reference to FIG. 8A and FIG. 8B. Description will be omitted below for the configuration common to that of the communication device according to the fifth embodiment (FIG. 7A and FIG. 7B).

Figure 8A:
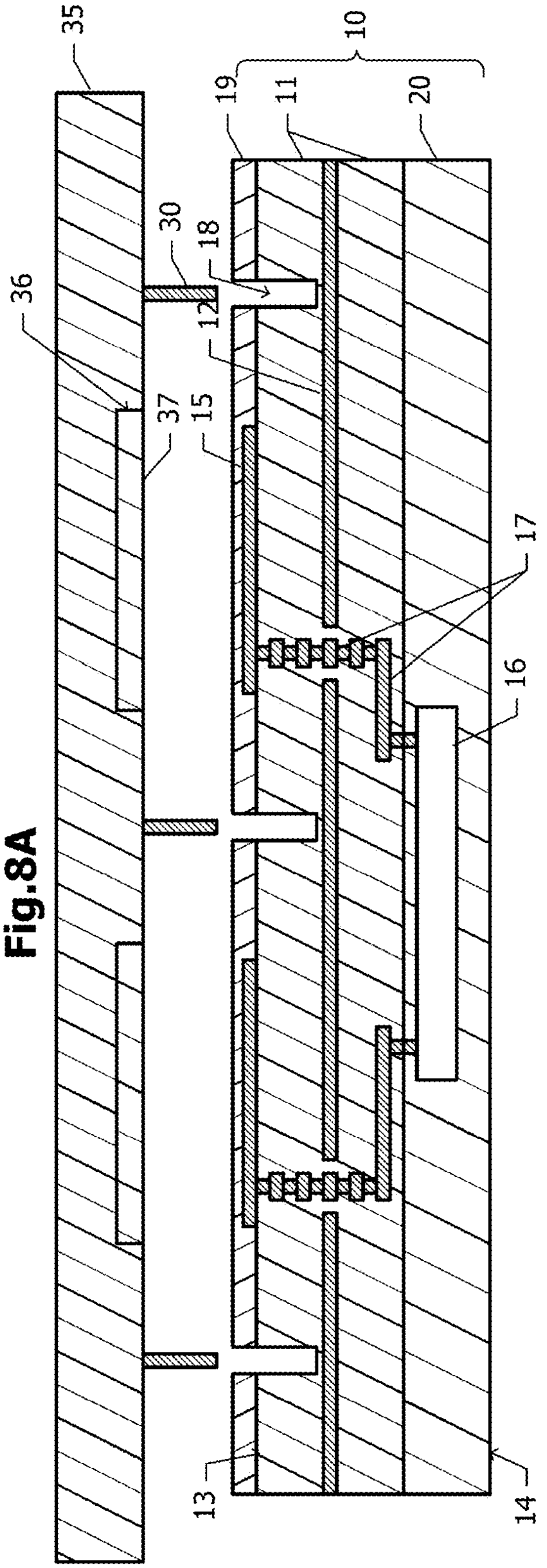
FIG. 8A is a sectional view of a communication device according to a sixth embodiment in a state that an antenna device is not attached to a supporting member.
Figure 8B:
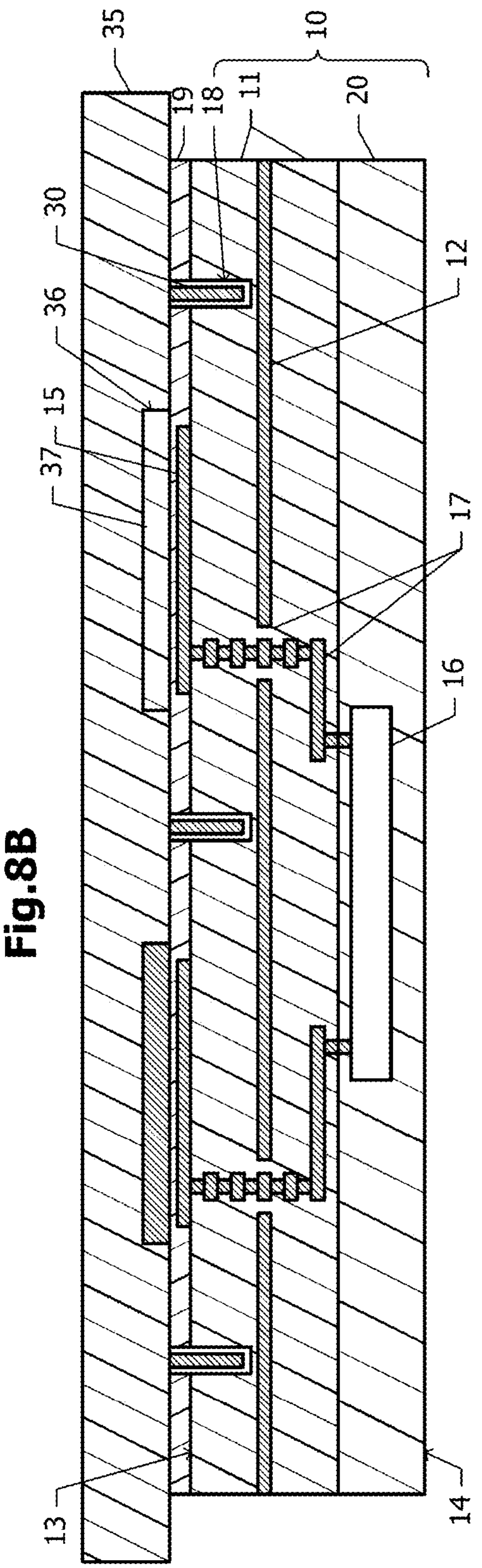
FIG. 8B is a sectional view of the communication device according to the sixth embodiment in a state that the antenna device is attached to the supporting member.

FIG. 8A is a sectional view of the communication device according to the sixth embodiment in a state that the antenna device 10 is not attached to the supporting member 35. FIG. 8B is a sectional view of the communication device according to the sixth embodiment in a state that the antenna device 10 is attached to the supporting member 35. In the fifth embodiment, there are hollows between the solder resist film 19 on the radiating elements 15 and the bottom surfaces of the recesses 36 (FIG. 7A and FIG. 7B). On the other hand, low permittivity members 37 are disposed in spaces between the solder resist film 19 on the radiating elements 15 and the bottom surfaces of the recesses 36, in the sixth embodiment. The low permittivity member 37 has lower permittivity than the permittivity of the supporting member 35. In the state that the antenna device 10 is attached to the supporting member 35, the low permittivity members 37 face the radiating elements 15 with the solder resist film 19 interposed therebetween.

Advantageous effects of the sixth embodiment will now be described. The low permittivity members 37, which have lower permittivity than the permittivity of the supporting member 35, are disposed between the radiating elements 15 and the supporting member 35 in the sixth embodiment, thereby reducing the influence of the supporting member 35 on the resonance wavelength of the radiating elements 15.

To sufficiently obtain this advantageous effect, it is preferable to set the thickness of the low permittivity member 37 to 1/10 or greater of the resonance wavelength of the radiating elements 15 (the wavelength in the low permittivity member 37).

Seventh Embodiment

A communication device according to a seventh embodiment will now be described with reference to FIG. 9A and FIG. 9B. Description will be omitted below for the configuration common to that of the communication device according to the first embodiment (FIG. 1, FIG. 2A, FIG. 2B, and FIG. 3).

Figure 9A:
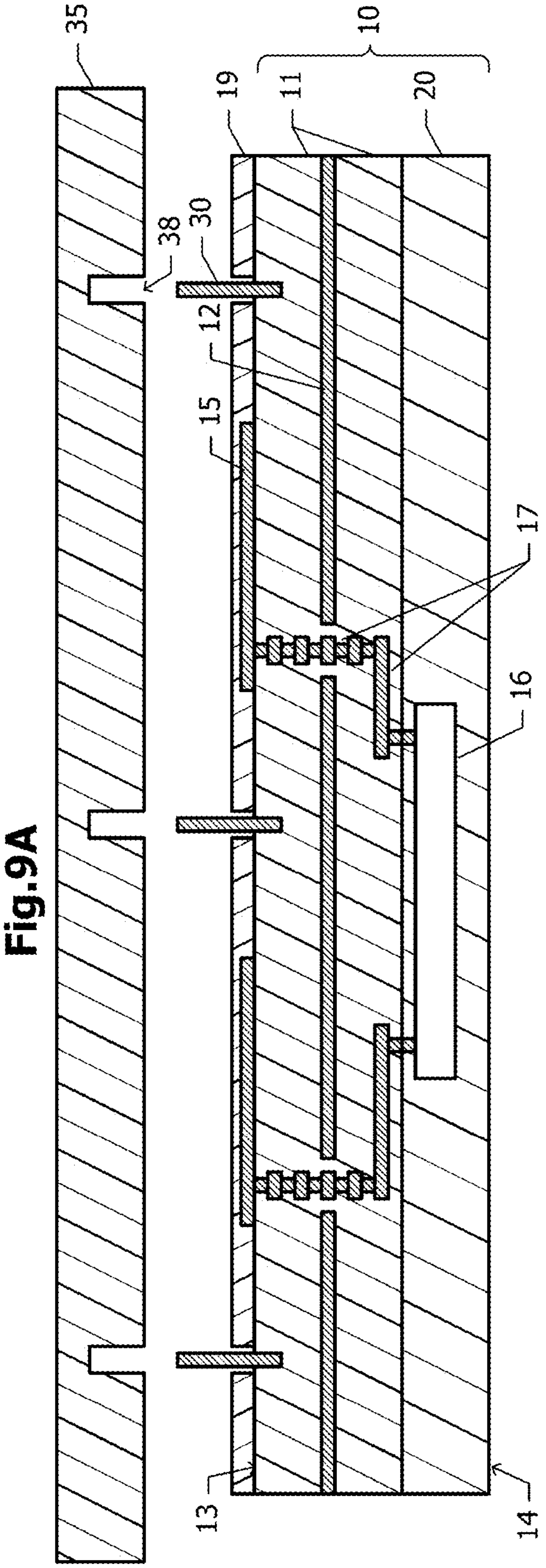
FIG. 9A is a sectional view of a communication device according to a seventh embodiment in a state that an antenna device is not attached to a supporting member.
Figure 9B:
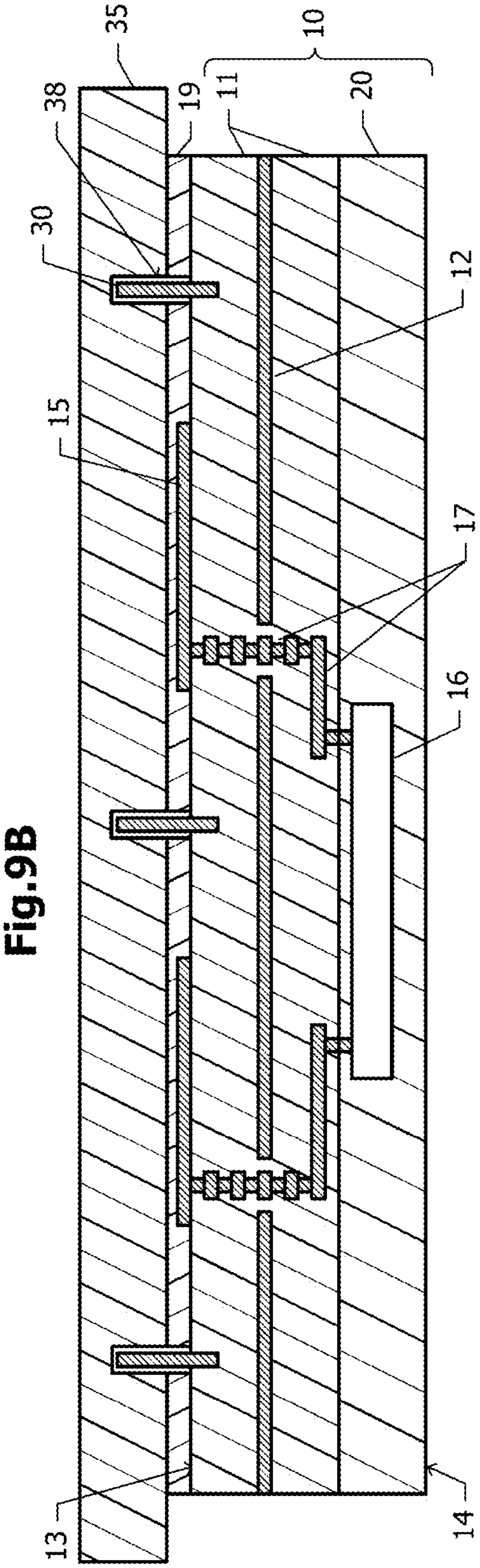
FIG. 9B is a sectional view of the communication device according to the seventh embodiment in a state that the antenna device is attached to the supporting member.

FIG. 9A is a sectional view of the communication device according to the seventh embodiment in a state that the antenna device 10 is not attached to the supporting member 35. FIG. 9B is a sectional view of the communication device according to the seventh embodiment in a state that the antenna device 10 is attached to the supporting member 35. In the first embodiment, the linear conductors 30 (FIG. 2A) are fixed on the supporting member 35 in the state before the antenna device 10 is attached to the supporting member 35. On the other hand, the linear conductors 30 are not fixed on the supporting member 35 but fixed on the antenna device 10 in the seventh embodiment. One end portion of the linear conductor 30 is embedded to a certain depth from the first surface 13 of the dielectric substrate 11. Concave portions 38 are formed on positions, corresponding to the linear conductors 30 respectively, of the supporting member 35.

The antenna device 10 is positioned with respect to the supporting member 35 by respectively inserting the linear conductors 30 in the concave portions 38.

Advantageous effects of the seventh embodiment will now be described. As is the case with the first embodiment, the antenna device 10 can be easily positioned with respect to the supporting member 35 also in the seventh embodiment. Further, the gain in the direction orthogonal to the first surface 13 can be increased.

Eighth Embodiment

A communication device according to an eighth embodiment will now be described with reference to FIG. 10A and FIG. 10B. Description will be omitted below for the configuration common to that of the communication device according to the first embodiment (FIG. 1, FIG. 2A, FIG. 2B, and FIG. 3).

Figure 10A:
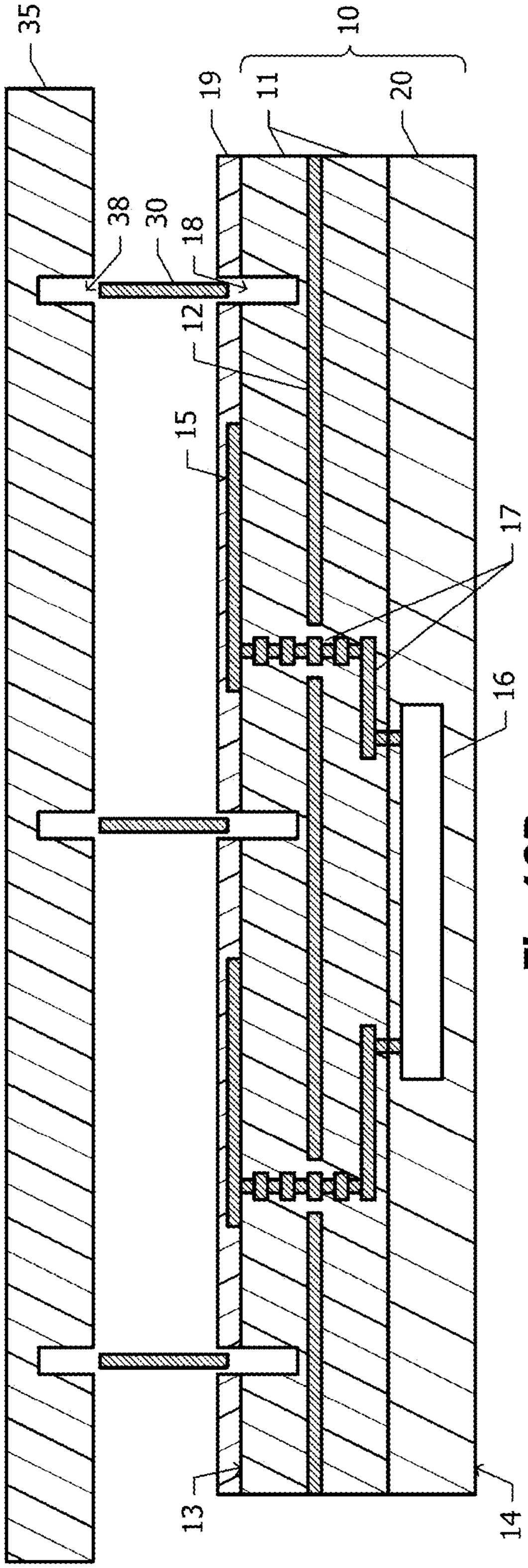
FIG. 10A is a sectional view of a communication device according to an eighth embodiment in a state that an antenna device is not attached to a supporting member.
Figure 10B:
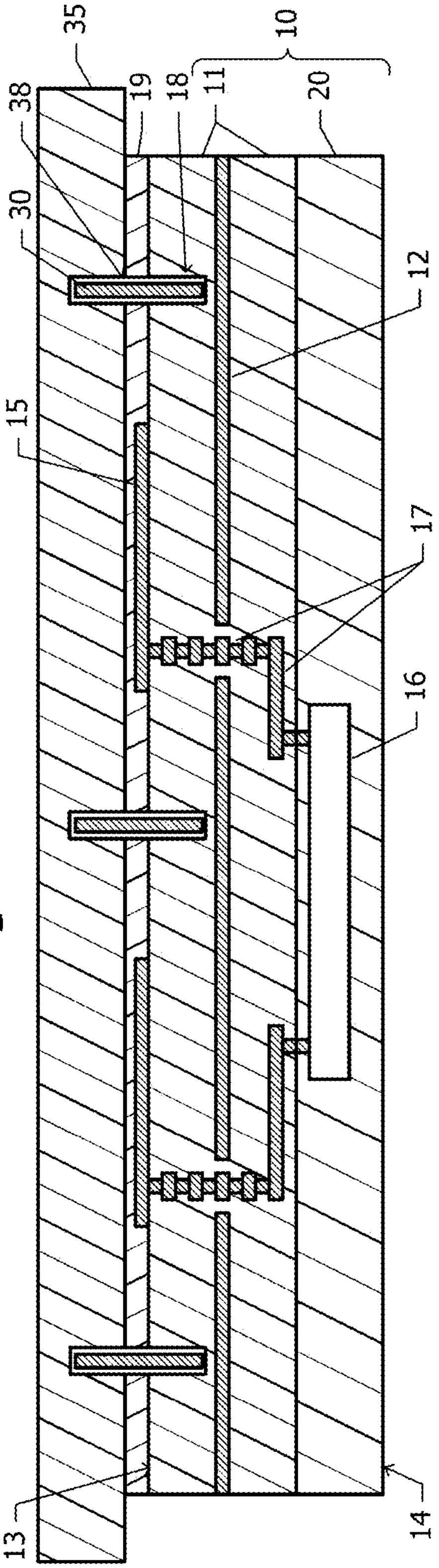
FIG. 10B is a sectional view of the communication device according to the eighth embodiment in a state that the antenna device is attached to the supporting member.

FIG. 10A is a sectional view of the communication device according to the eighth embodiment in a state that the antenna device 10 is not attached to the supporting member 35. FIG. 10B is a sectional view of the communication device according to the eighth embodiment in a state that the antenna device 10 is attached to the supporting member 35. In the first embodiment, the linear conductors 30 (FIG. 2A) are fixed on the supporting member 35 in the state before the antenna device 10 is attached to the supporting member 35. On the other hand, the linear conductors 30 are not fixed on the antenna device 10 or the supporting member 35 in the state before the antenna device 10 is attached to the supporting member 35, in the eighth embodiment.

A plurality of concave portions 18 are formed on the first surface 13 of the antenna device 10 and a plurality of concave portions 38 are formed on the surface, facing the antenna device 10, of the supporting member 35. When the antenna device 10 is attached to the supporting member 35, one end portions of the linear conductors 30 are inserted into the concave portions 38 of the supporting member 35 respectively. In this state, the other end portions of the linear conductors 30 protrude from the surface of the supporting member 35. The dimension of the concave portion 38 is set to the size with which the linear conductor 30 does not easily fall off. For example, even if the surface on which the concave portions 38 are formed faces downward, the linear conductors 30 do not fall off due to gravity. The antenna device 10 is positioned with respect to the supporting member 35 by inserting the protruding portions of the linear conductors 30 in the concave portions 18 of the antenna device 10 respectively.

Here, the linear conductors 30 may be first inserted in the concave portions 18 of the antenna device 10 and protruding portions of the linear conductors 30 may be inserted in the concave portions 38 of the supporting member 35 after that.

Advantageous effects of the eighth embodiment will now be described. As is the case with the first embodiment, the antenna device 10 can be easily positioned with respect to the supporting member 35 also in the eighth embodiment. Further, the gain in the direction orthogonal to the first surface 13 can be increased.

Ninth Embodiment

A communication device according to a ninth embodiment will now be described with reference to FIG. 11A and FIG. 11B. Description will be omitted below for the configuration common to that of the communication device according to the third embodiment (FIG. 5A and FIG. 5B).

Figure 11A:
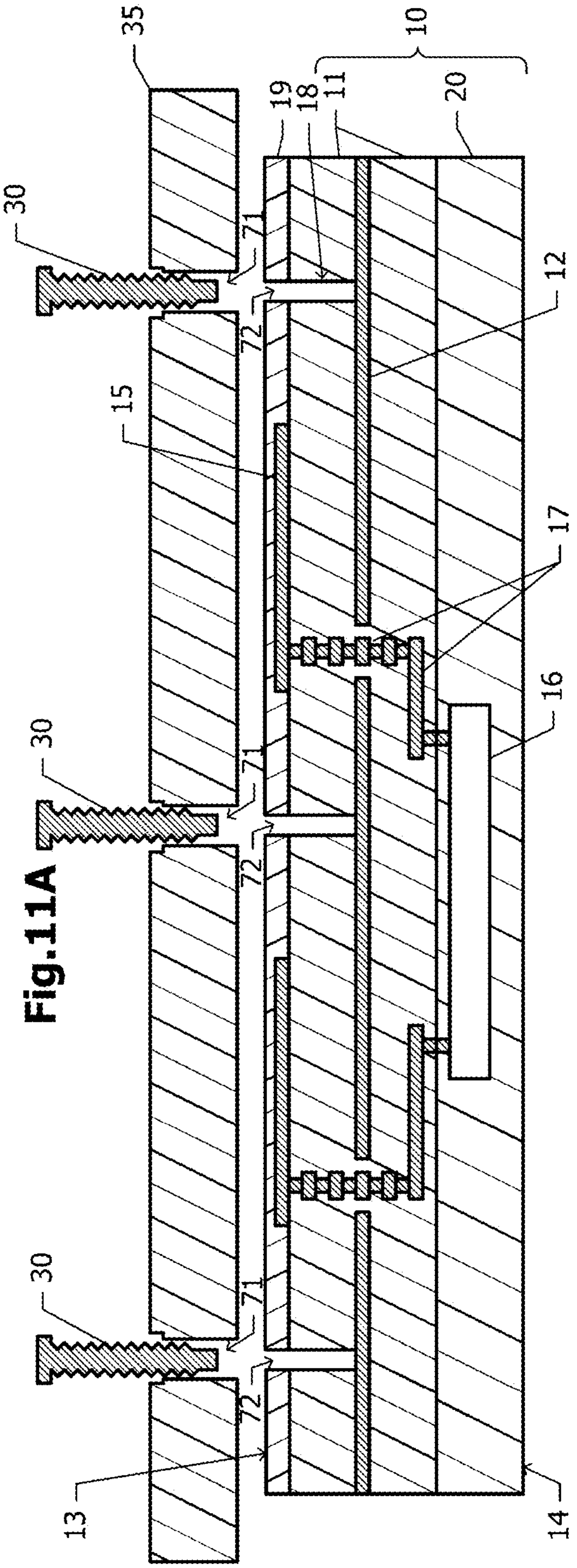
FIG. 11A is a sectional view of a communication device according to a ninth embodiment in a state that an antenna device is not attached to a supporting member.
Figure 11B:
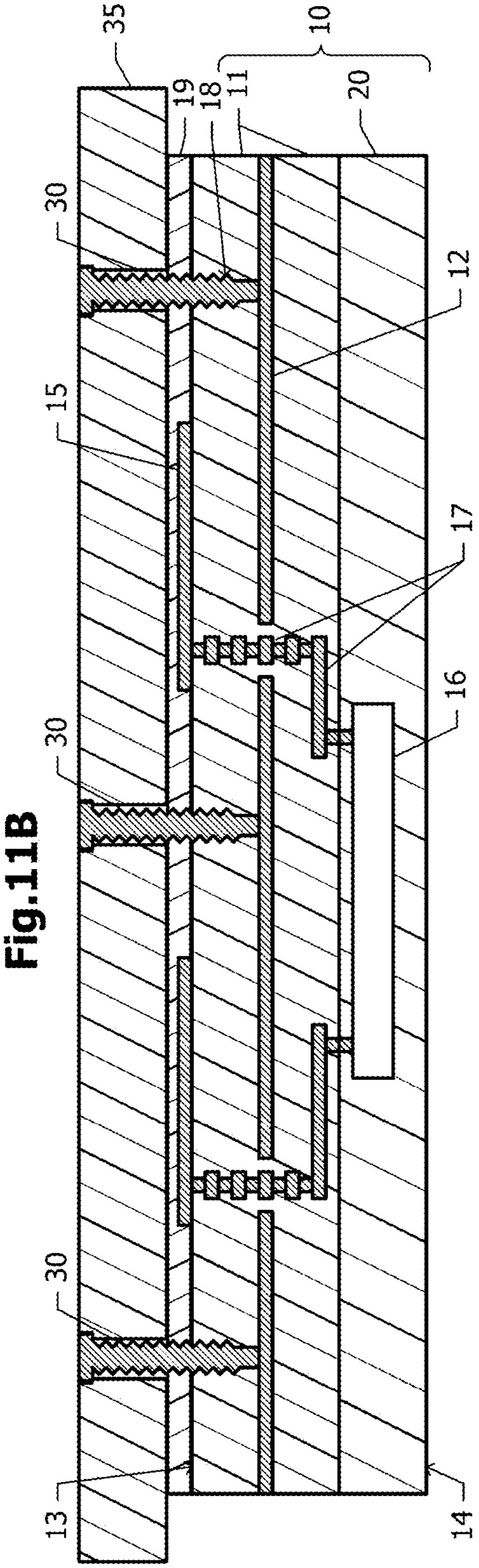
FIG. 11B is a sectional view of the communication device according to the ninth embodiment in a state that the antenna device is attached to the supporting member.

FIG. 11A is a sectional view of the communication device according to the ninth embodiment in a state that the antenna device 10 is not attached to the supporting member 35. FIG. 11B is a sectional view of the communication device according to the ninth embodiment in a state that the antenna device 10 is attached to the supporting member 35. In the third embodiment, conductor pins that are fixed on the supporting member 35 are used as the linear conductors 30 (FIG. 5A and FIG. 5B). On the other hand, screws that are formed with conductors made of metal or the like, such as tapping screws, are used as the linear conductors 30, in the ninth embodiment.

A plurality of insertion holes (drill holes) 71 for inserting screws are formed through the supporting member 35. Counterboring processing is performed with respect to each of the insertion holes 71. A plurality of prepared holes 72 for tapping are formed on the dielectric substrate 11. The plurality of insertion holes 71 and the plurality of prepared holes 72 are arranged to correspond to each other in a plan view in the state that the antenna device 10 is positioned with respect to the supporting member 35.

Tapping screws are inserted through the insertion holes 71 of the supporting member 35 and are screwed in the prepared holes 72 formed on the dielectric substrate 11, thus being fixed in the antenna device 10 and the supporting member 35. When the tapping screws come into contact with the ground conductor 12, the tapping screws are electrically connected with the ground conductor 12.

Advantageous effects of the ninth embodiment will now be described.

In the ninth embodiment, the linear conductors 30 composed of the tapping screws are electromagnetically coupled with the radiating elements 15, acting as a parasitic monopole antenna. Accordingly, the gain in the direction orthogonal to the normal direction of the first surface 13 can be increased as is the case with the third embodiment. Further, the antenna device 10 can be easily positioned with respect to the supporting member 35 by aligning the insertion holes 71 of the supporting member 35 and the prepared holes 72 of the dielectric substrate 11.

A modification of the ninth embodiment will now be described. The linear conductors 30 composed of the tapping screws are brought into contact with the ground conductor 12 in the ninth embodiment. However, the configuration may be employed that the linear conductors 30 are not brought into contact with the ground conductor 12 as the linear conductors 30 of the first embodiment (FIG. 2B).

It goes without saying that each of the above-described embodiments is exemplary and the configurations described in different embodiments can be partially replaced or combined with each other. Similar effects provided by similar configurations in a plurality of embodiments are not mentioned sequentially for each of the embodiments. Further, the present disclosure is not limited to the above-described embodiments. It is obvious for those skilled in the art that various alterations, improvements, combinations, and the like can be made.

The invention claimed is:

1. An antenna device comprising:
a dielectric substrate;
a patch antenna that includes a radiating element and a ground conductor which are provided on or within the dielectric substrate;
a supporting member that supports the antenna device; and
a linear conductor that fixes a relative position between the antenna device and the supporting member in a direction orthogonal to a normal direction of the dielectric substrate, wherein at least a part of the linear conductor is configured to be electromagnetically coupled with the patch antenna.

2. The antenna device of claim 1, wherein
the linear conductor is parallel to a normal direction of the radiating element.

3. The antenna device of claim 1, wherein
the linear conductor is fixed on the supporting member,
a concave portion is formed on the antenna device, and
the linear conductor is configured to be inserted in the concave portion.

4. The antenna device of claim 1, wherein
the linear conductor is fixed on the dielectric substrate,
a concave portion is formed on the supporting member, and
the linear conductor is configured to be inserted in the concave portion.

5. The antenna device of claim 1, wherein
a first concave portion and a second concave portion are formed on the dielectric substrate and the supporting member respectively, and
one end portion of the linear conductor is configured to be inserted in the first concave portion and the other end portion is configured to be inserted in the second concave portion.

6. The antenna device of claim 1, wherein
the radiating element is provided on a first surface of the dielectric substrate, and
the supporting member is disposed to face the first surface.

7. The antenna device of claim 6, wherein
an electric length of the linear conductor is ½ of a resonance wavelength of the radiating element, and
both end portions of the linear conductor are in an electrically-open state.

8. The antenna device of claim 6, wherein
the linear conductor is short-circuited or capacitive-coupled with the ground conductor, and
an electric length of a part of the linear conductor that is positioned closer to the first surface from a point at which the linear conductor is coupled with the ground conductor is ¼ of a resonance wavelength of the radiating element.

9. The antenna device of claim 6, wherein
the linear conductor protrudes from the first surface toward the supporting member.

10. The antenna device of claim 6, wherein
a hollow is formed between the radiating element and the supporting member.

11. The antenna device of claim 6, further comprising:
a low permittivity member that has a lower permittivity than a permittivity of the supporting member and is disposed to face the radiating element.

12. The antenna device of claim 1, wherein the radiating element is provided on a first surface of the dielectric substrate, a through hole is formed through the antenna device, the through hole reaching the first surface from a second surface which is on an opposite side to the first surface, and the supporting member is configured to be disposed to face the second surface of the antenna device.

13. The antenna device of claim 12, wherein the linear conductor is configured to be inserted in the through hole in a manner fixed on the supporting member, reaches a position closer to the first surface than a position on which the ground conductor is disposed, and is short-circuited or capacitive-coupled with the ground conductor.

14. The antenna device of claim 13, wherein an electric length of a part of the linear conductor that is positioned closer to the first surface from a point at which the linear conductor is coupled with the ground conductor is ¼ of a resonance wavelength of the radiating element.

15. The antenna device of claim 12, wherein the linear conductor is configured to be inserted in the through hole in a manner fixed on the supporting member, and an electric length of the linear conductor is ½ of a resonance wavelength of the radiating element.

16. The antenna device of claim 1, wherein the radiating element has a planar shape having four sides that overlap with respective four sides of a rectangle.

17. The antenna device of claim 16, wherein the linear conductor is disposed on a position that is separated from the radiating element from a midpoint of one side in the planar shape of the radiating element in a direction orthogonal to the side in a plan view.

18. The antenna device of claim 1, wherein the radiating element resonates in a frequency band from 20 GHz to 300 GHz inclusive.

19. A communication device comprising:

an antenna device comprising a dielectric substrate; and a patch antenna that includes a radiating element and a ground conductor which are provided on or within the dielectric substrate;

a supporting member that supports the antenna device; and a linear conductor that fixes a relative position between the antenna device and the supporting member in a direction orthogonal to a normal direction of the dielectric substrate, wherein at least a part of the linear conductor is electromagnetically coupled with the patch antenna.

20. An antenna device comprising:

a dielectric substrate;

a patch antenna that includes a radiating element disposed on the dielectric substrate; and a ground conductor disposed within the dielectric substrate;

a connection interface configured to attach the antenna device to a supporting member via at least a first a linear conductor that fixes a relative position between the antenna device and the supporting member in a direction orthogonal to a normal direction of the dielectric substrate.

* * * * *